US012308533B2

(12) United States Patent
Hara

(10) Patent No.: US 12,308,533 B2
(45) Date of Patent: May 20, 2025

(54) ANTENNA MODULE

(71) Applicant: TDK Corporation, Tokyo (JP)

(72) Inventor: Yasuyuki Hara, Tokyo (JP)

(73) Assignee: TDK Corporation, Tokyo (JP)

( * ) Notice: Subject to any disclaimer, the term of this patent is extended or adjusted under 35 U.S.C. 154(b) by 110 days.

(21) Appl. No.: 17/900,196

(22) Filed: Aug. 31, 2022

(65) Prior Publication Data

US 2023/0065650 A1 Mar. 2, 2023

(30) Foreign Application Priority Data

Sep. 1, 2021 (JP) ................................ 2021-142394

(51) Int. Cl.

*H01Q 9/04* (2006.01)
*H01Q 1/48* (2006.01)
*H01Q 1/50* (2006.01)
*H01Q 21/00* (2006.01)
*H01Q 21/06* (2006.01)

(52) U.S. Cl.

CPC ............... *H01Q 9/045* (2013.01); *H01Q 1/48* (2013.01); *H01Q 1/50* (2013.01); *H01Q 21/0025* (2013.01); *H01Q 21/065* (2013.01)

(58) Field of Classification Search

USPC .......................................................... 343/848
See application file for complete search history.

(56) References Cited

U.S. PATENT DOCUMENTS

| | | | | |
|---|---|---|---|---|
| 6,320,542 | B1 | 11/2001 | Yamamoto et al. | |
| 2004/0201524 | A1 | 10/2004 | Yuanzhu | |
| 2017/0214123 | A1* | 7/2017 | Park | H01Q 5/335 |
| 2020/0161767 | A1* | 5/2020 | Hara | H01Q 9/0414 |
| 2021/0184344 | A1* | 6/2021 | Furuhi | H01Q 1/38 |
| 2021/0242601 | A1 | 8/2021 | Johansson et al. | |
| 2021/0280970 | A1* | 9/2021 | Ueda | H01Q 21/29 |

FOREIGN PATENT DOCUMENTS

| | | | | | |
|---|---|---|---|---|---|
| JP | 2007142876 | A * | 6/2007 | | |
| JP | 2016-15532 | A | 1/2016 | | |
| WO | 2020/066604 | A1 | 4/2020 | | |
| WO | 2020/095755 | A1 | 5/2020 | | |
| WO | WO-2021210297 | A1 * | 10/2021 | | H01Q 1/48 |

* cited by examiner

*Primary Examiner* — Hoang V Nguyen
*Assistant Examiner* — Brandon Sean Woods
(74) *Attorney, Agent, or Firm* — Rimon P.C.

(57) ABSTRACT

Disclosed herein is an antenna module that includes a ground pattern, a radiation electrode disposed on the ground pattern, a feed electrode disposed between the ground pattern and the radiation electrode, and a ground conductor surrounding the radiation electrode and feed electrode in a plan view. The planar size of the radiation electrode is smaller than the planar size of the feed electrode.

13 Claims, 8 Drawing Sheets

ANTENNA MODULE

This application claims the benefit of Japanese Patent Application No. 2021-142394, filed on Sep. 1, 2021, the entire disclosure of which is incorporated by reference herein.

BACKGROUND

The present disclosure relates to an antenna module.

International Publication WO 2020/066604 discloses an antenna module having a structure in which a radiation electrode is surrounded by a plurality of columnar conductors.

In the antenna module described in International Publication WO 2020/066604, power is directly fed to the radiation electrode by way of a feed line, so that it is not easy to control its characteristics. Further, a parasitic radiation electrode is disadvantageously coupled to the columnar conductors too strongly.

SUMMARY

An antenna module according to one embodiment of the present disclosure includes: a ground pattern; a radiation electrode disposed on the ground pattern; a feed electrode disposed between the ground pattern and the radiation electrode; and a ground conductor surrounding the radiation electrode and feed electrode in a plan view. The planar size of the radiation electrode is smaller than the planar size of the feed electrode.

BRIEF DESCRIPTION OF THE DRAWINGS

The above features and advantages of the present disclosure will be more apparent from the following description of certain preferred embodiments taken in conjunction with the accompanying drawings, in which:

FIG. 10A is a schematic plan view, and FIG. 10B is a schematic side view;

FIG. 11A illustrates characteristics when W1>W2 and W3>H1 are both satisfied, FIG. 11B illustrates characteristics when W1=W2 and W3>H1 are both satisfied, and FIG. 11C illustrates characteristics when W1>W2 and W3<H1 are both satisfied.

DETAILED DESCRIPTION OF THE EMBODIMENTS

An object of the present disclosure is to provide an improved antenna module.

Preferred embodiments of the present disclosure will be explained below in detail with reference to the accompanying drawings.

Figure 1:
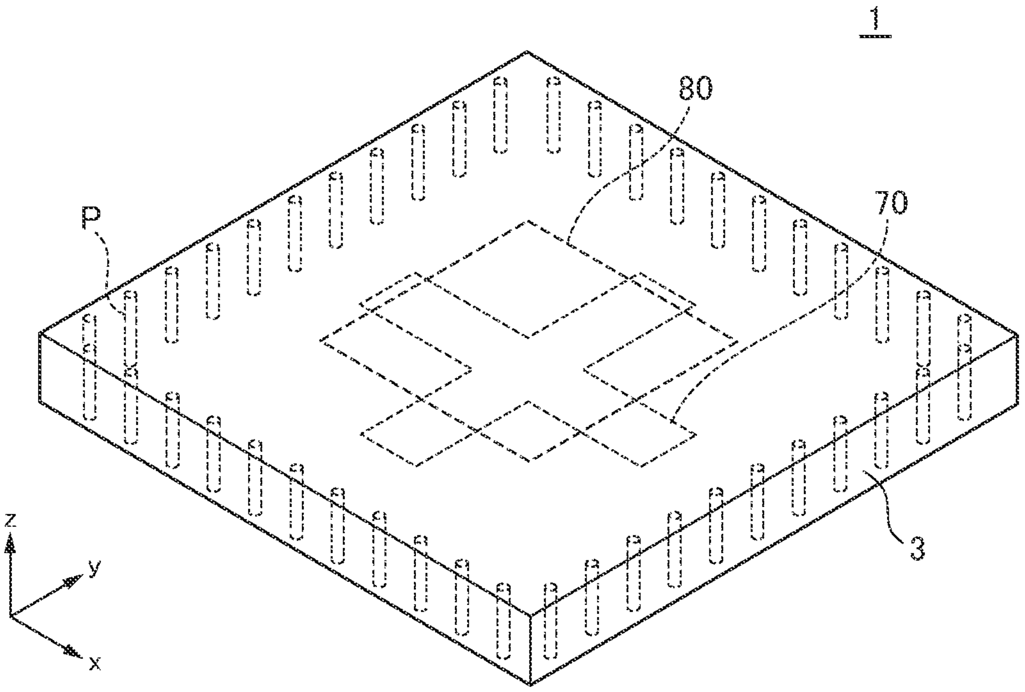
FIG. 1 is a schematic perspective view illustrating the outer appearance of an antenna module 1 according to a first embodiment of the present disclosure.

FIG. 1 is a schematic perspective view illustrating the outer appearance of an antenna module 1 according to a first embodiment of the present disclosure.

As illustrated in FIG. 1, the antenna module 1 according to the first embodiment includes a flat plate-shaped element body 3 in which the xy-direction and the z-direction are defined as the planar direction and the thickness direction, respectively, and a plurality of conductor patterns including a feed electrode 70, a radiation electrode 80, and a pillar-shaped ground conductor P which are embedded in the element body 3. The element body 3 has a multilayer structure and can be made of a ceramic material such as LTCC (Low Temperature Co-Fired Ceramics) or a resin material. The ground conductor P is a conductor pattern applied with a ground potential and is provided so as to surround the feed electrode 70 and radiation electrode 80 in a plan view from the z-direction. Although the ground conductor P is constituted of a plurality of pillar-shaped conductors in the example illustrated in FIG. 1, the feed electrode 70 and radiation electrode 80 may be surrounded by a wall-shaped conductor having an xz surface or yz surface. Further, as will be described later, the plurality of pillar-shaped conductors may be short-circuited by a rectangular annular pattern.

FIGS. 2 to 9 are schematic plan views each illustrating the pattern shape of a conductor pattern included in the antenna module 1.

Figure 2:
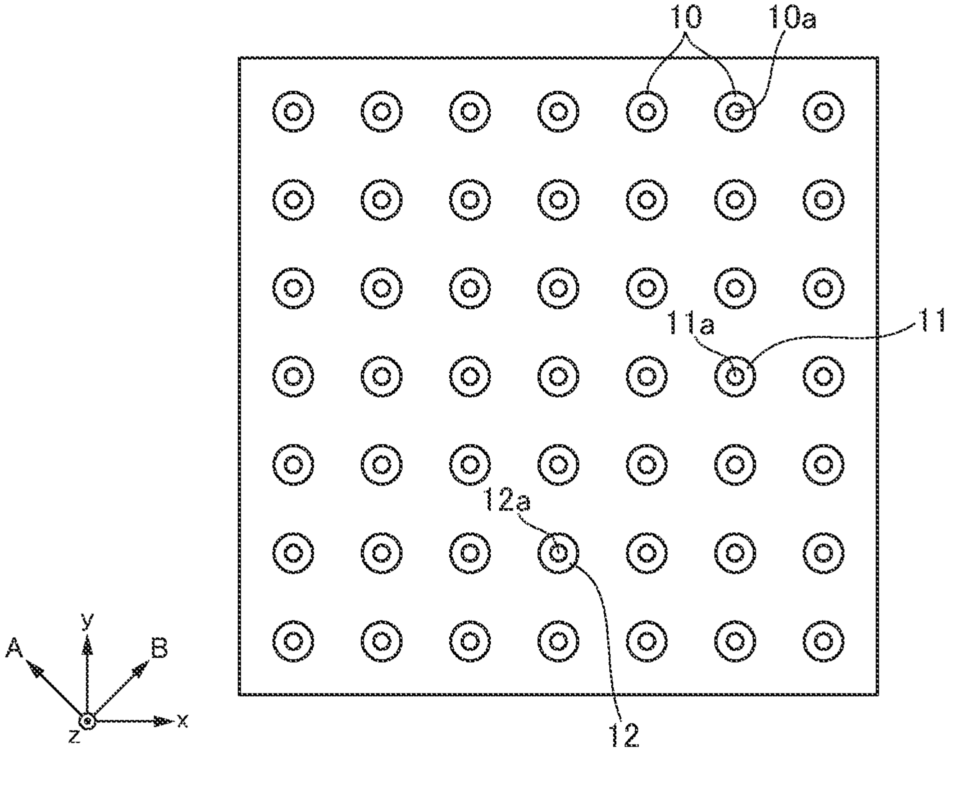
FIGS. 2 to 9 are schematic plan views each illustrating the pattern shape of a conductor pattern included in the antenna module 1.

The conductor pattern illustrated in FIG. 2 is a conductor pattern of a lowermost conductor layer. The lowermost conductor layer has a plurality of ground pads 10, a first signal pad 11, and a second signal pad 12. The first signal pad 11 is a terminal for transmitting/receiving, for example, a vertically polarized signal, and the second signal pad 12 is a terminal for transmitting/receiving, for example, a horizontally polarized signal. The plurality of ground pads 10, first signal pad 11, and second signal pad 12 may each have a solder ball mounted thereon. In the example of FIG. 2, 7×7 pads are arranged in an array in the x- and y-directions, and one of them is the first signal pad 11, another one of them is the second signal pad 12, and the remaining 47 pads are ground pads 10. Some ground pads 10 may be omitted. Although not particularly limited, the positions of the first and second signal pads 11 and 12 may not be positioned at the outer periphery and may be symmetrically positioned with respect to the diagonal line extending in the direction A. Each of the ground pads 10, first signal pad 11, and second signal pad 12 are connected respectively with through hole conductors 10*a*, 11*a*, and 12*a* extending in the z-direction.

Figure 3:
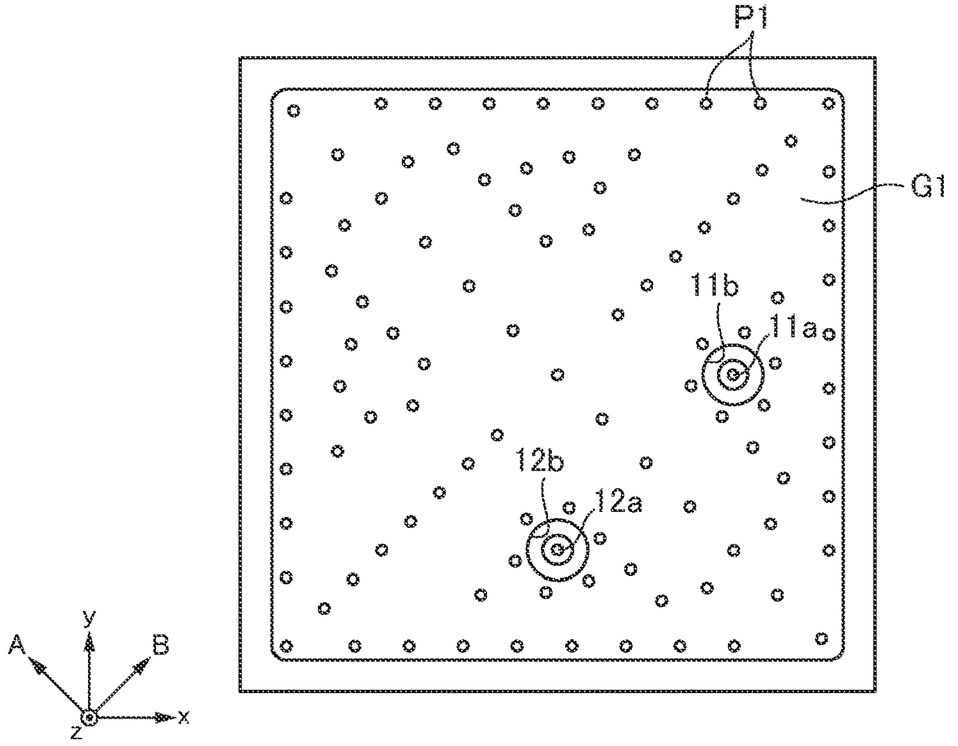

The conductor pattern illustrated in FIG. 3 is a conductor pattern positioned in the upper layer of the conductor pattern illustrated in FIG. 2 and has a ground pattern G1 formed on substantially the entire surface of the xy plane. The ground pattern G1 is connected to the plurality of ground pads 10 through the through hole conductors 10*a* illustrated in FIG. 2. As illustrated in FIG. 3, the ground pattern G1 has openings 11*b* and 12*b*, and the through hole conductors 11*a* and 12*a* pass through the openings 11*b* and 12*b*, respectively, to be connected to a conductor pattern in the upper layer. The ground pattern G1 is further connected to a ground pattern in the upper layer through a plurality of through hole conductors P1.

Figure 4:
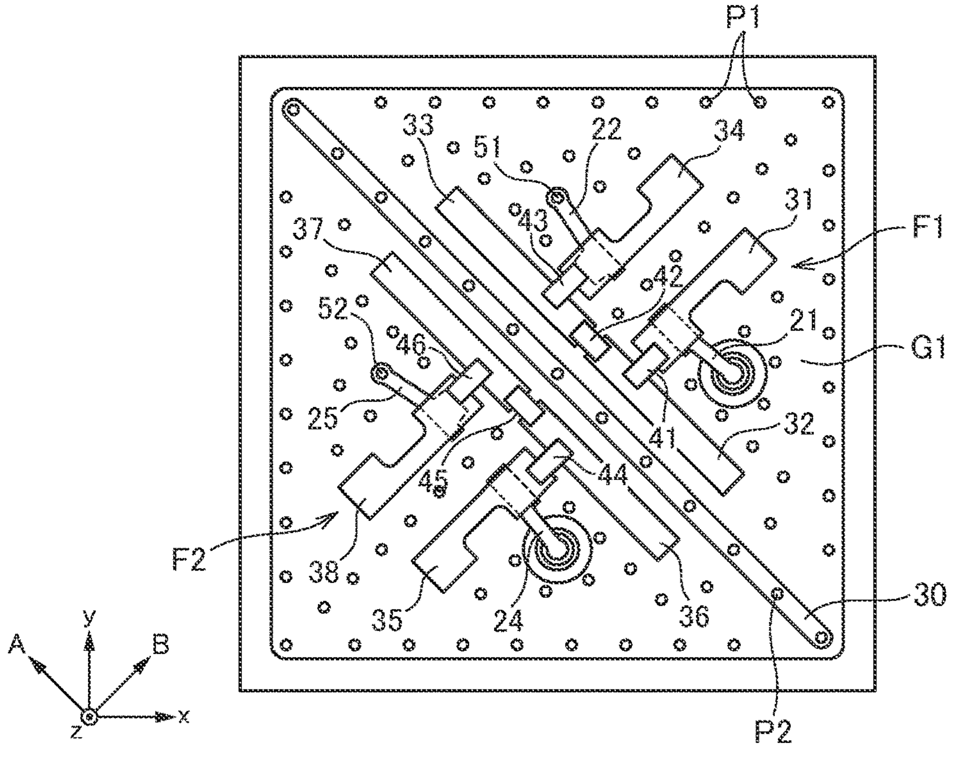

The conductor pattern illustrated in FIG. 4 is a conductor pattern positioned in the upper layer of the conductor pattern illustrated in FIG. 3 and has a ground pattern 30 disposed on the diagonal line extending in the direction A, a first ½ wavelength filer F1, and a second ½ wavelength filer F2. The ground pattern 30 is connected to the ground pattern G1 through the through hole conductors P1 illustrated in FIG. 3. The ground pattern 30 is further connected to a ground pattern in the upper layer through a plurality of through hole conductors P2. The first and second ½ wavelength filers F1 and F2 are each a band-pass filter having a so-called π type structure.

The first ½ wavelength filer F1 includes first to fourth resonance patterns 31 to 34 that are conductor patterns. As illustrated in FIG. 4, the second and third resonance patterns 32 and 33 are arranged in a line so as to extend in the direction A along the ground pattern 30, i.e., the diagonal line. Further, the first and fourth resonance patterns 31 and 34 extend in the direction B, respectively with respect to the second and third resonance patterns 32 and 33. The direction B is the extending direction of another diagonal line and is perpendicular to the direction A.

The first resonance pattern 31 overlaps a part of a first wiring 21. The first wiring 21 is connected to the first signal pad 11 through the through hole conductor 11*a*. Accordingly, the first resonance pattern 31 is connected to the first signal pad 11 through capacitive coupling to the first wiring 21. The first and second resonance patterns 31 and 32 are capacitively coupled to each other through a coupling pattern 41. The second and third resonance patterns 32 and 33 are capacitively coupled to each other through a coupling pattern 42. The third and fourth resonance patterns 33 and 34 are capacitively coupled to each other through a coupling pattern 43. The fourth resonance pattern 34 overlaps a part of a second wiring 22. The second wiring 22 is connected to a conductor pattern in the upper layer through a first through hole conductor 51. The coupling patterns 41 to 43 are each a conductor pattern.

The first wiring 21 is a conductor pattern extending substantially in the direction A. The first wiring 21 is connected at its one end to the through hole conductor 11*a* and overlaps at its other end the first resonance pattern 31. Thus, the through hole conductor 11*a* is provided at a planar position different from the first resonance pattern 31. That is, the opening 11*b* through which the through hole conductor 11*a* penetrates is provided at a position not overlapping the first resonance pattern 31.

The second wiring 22 is a conductor pattern extending substantially in the direction A. The second wiring 22 overlaps at its one end the fourth resonance pattern 34 and is connected at its other end to the first through hole conductor 51. Thus, the first through hole conductor 51 is provided at a planar position different from the fourth resonance pattern 34.

The first to fourth resonance patterns 31 to 34 each constitute a resonator. The first to fourth resonance patterns 31 to 34 are each a both-end open type resonator whose both ends are opened. The length of each of the second and third resonance patterns 32 and 33 is set to about ½ of the passband frequency of the first ½ wavelength filer F1. In each of the first and fourth resonance patterns 31 and 34, the pattern width thereof in the direction A is smaller at the center portion between both end portions thereof in the direction B than that at the both end portions. In the present embodiment, the center portion of the first resonance pattern 31 is offset to the fourth resonance pattern 34 side in the direction A with respect to the both end portions, and the edges of the first resonance pattern 31 on the side close to the fourth resonance pattern 34 in the direction A at the both end portions and the center portion are flush with each other. Similarly, the center portion of the fourth resonance pattern 34 is offset to the first resonance pattern 31 side in the direction A with respect to the both end portions, and the edges of the fourth resonance pattern 34 on the side close to the first resonance pattern 31 in the direction A at the both end portions and the center portion are flush with each other.

The second ½ wavelength filter F2 has a symmetric structure to the first ½ wavelength filer F1 with respect to the ground pattern 30. The second ½ wavelength filer F2 includes fifth to eighth resonance patterns 35 to 38 which are conductor patterns. As illustrated in FIG. 4, the sixth and seventh resonance patterns 36 and 37 are arranged in a line so as to extend in the direction A along the ground pattern 30, i.e., the diagonal line. The sixth resonance pattern 36 is disposed so as to face the second resonance pattern 32 in the direction B, and the seventh resonance pattern 37 is disposed so as to face the third resonance pattern 33 in the direction B. The fifth and eighth resonance patterns 35 and 38 extend in the B direction, respectively with respect to the sixth and seventh resonance patterns 36 and 37.

The fifth resonance pattern 35 overlaps a part of a fourth wiring 24. The fourth wiring 24 is connected to the second signal pad 12 through the through hole conductor 12*a*. Accordingly, the fifth resonance pattern 35 is connected to the second signal pad 12 through capacitive coupling to fourth wiring 24. The fifth and sixth resonance patterns 35 and 36 are capacitively coupled to each other through a coupling pattern 44. The sixth and seventh resonance patterns 36 and 37 are capacitively coupled to each other through a coupling pattern 45. The seventh and eighth resonance patterns 37 and 38 are capacitively coupled to each other through a coupling pattern 46. The eighth resonance pattern 38 overlaps a part of a fifth wiring 25. The fifth wiring 25 is connected to a conductor pattern in the upper layer through a second through hole conductor 52. The coupling patterns 44 to 46 are each a conductor pattern.

The fourth wiring 24 is a conductor pattern extending substantially in the direction A. The fourth wiring 24 is connected at its one end to the through hole conductor 12*a* and overlaps at its other end the fifth resonance pattern 35. Thus, the through hole conductor 12*a* is provided at a planar position different from the fifth resonance pattern 35. That is, the opening 12*b* through which the through hole conductor 12*a* penetrates is provided at a position not overlapping the fifth resonance pattern 35 in a plan view.

The fifth wiring 25 is a conductor pattern extending substantially in the direction A. The fifth wiring 25 overlaps at its one end the eighth resonance pattern 38 and is connected at its other end to the second through hole conductor 52. Thus, the second through hole conductor 52 is provided at a planar position different from the eighth resonance pattern 38.

The fifth to eighth resonance patterns 35 to 38 each constitute a resonator. The fifth to eighth resonance patterns 35 to 38 are each a both-end open type resonator whose both ends are opened. The length of each of the sixth and seventh resonance patterns 36 and 37 is set to about ½ of the passband frequency of the second ½ wavelength filer F2. In each of the fifth and eighth resonance patterns 35 and 38, the pattern width thereof in the direction A is smaller at the center portion between both end portions thereof in the direction B than that at the both end portions. In the present embodiment, the center portion of the fifth resonance pattern 35 is offset to the eighth resonance pattern 38 side in the direction A with respect to the both end portions, and the edges of the fifth resonance pattern 35 on the side close to the eighth resonance pattern 38 in the direction A at the both end portions and the center portion are flush with each other. Similarly, the center portion of the eighth resonance pattern 38 is offset to the fifth resonance pattern 35 side in the direction A with respect to the both end portions, and the edges of the eighth resonance pattern 38 on the side close to the fifth resonance pattern 35 in the direction A at the both end portions and the center portion are flush with each other.

The overlap area between the fourth resonance pattern 34 and the second wiring 22 and the overlap area between the eighth resonance pattern 38 and the fifth wiring 25 are larger than the overlap area between the first resonance pattern 31 and the first wiring 21 and the overlap area between the fifth resonance pattern 35 and the fourth wiring 24. This facilitates impedance matching to make it possible to widen a band in which a satisfactory return loss can be obtained.

Figure 5:
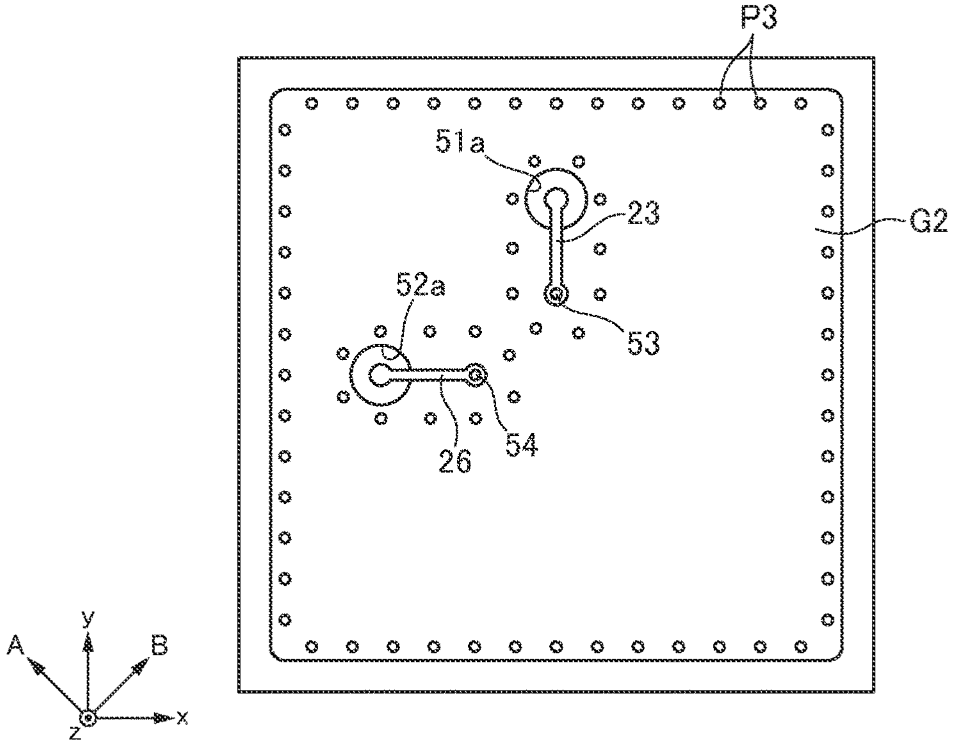

The conductor pattern illustrated in FIG. 5 is a conductor pattern positioned in the upper layer of the conductor pattern illustrated in FIG. 4 and has a ground pattern G2 formed on substantially the entire surface of the xy plane. The ground pattern G2 is connected to the ground patterns G1 and 30 through their through hole conductors P1 and P2 illustrated in FIGS. 3 and 4. As illustrated in FIG. 5, the ground pattern G2 has first and second openings 51*a* and 52*a*, and the first and second through hole conductors 51 and 52 pass through the first and second openings 51*a* and 52*a*, respectively, to be connected respectively to one ends of the third and sixth wirings 23 and 26 positioned in the upper layer of the ground pattern G2. Since the first through hole conductor 51 is connected to the other end of the second wiring 22, the first opening 51*a* through which the first through hole conductor 51 penetrates is provided at a position not overlapping the fourth resonance pattern 34 in a plan view. Further, since the second through hole conductor 52 is connected to the other end of the fifth wiring 25, the second opening 52*a* through which the second through hole conductor 52 penetrates is provided at a position not overlapping the eighth resonance pattern 38 in a plan view. The pattern width of each of the third and sixth wirings 23 and 26 is designed to be smaller than the pattern width of each of the second and fifth wirings 22 and 25. This facilitates impedance matching to make it possible to widen a band in which a satisfactory return loss can be obtained. The ground pattern G2 is further connected to a ground pattern in the upper layer through a plurality of through hole conductors P3.

The third wiring 23 is a conductor pattern extending in the y-direction. The third wiring 23 is connected at its one end to the first through hole conductor 51 and connected at its the other end to the through hole conductor 53. Thus, the first through hole conductor 51 and the through hole conductor 53 are provided at mutually different positions.

The sixth wiring 26 is a conductor pattern extending in the x-direction. The sixth wiring 26 is connected at its one end to the second through hole conductor 52 and connected at its other end to the through hole conductor 54. Thus, the second through hole conductor 52 and the through hole conductor 54 are provided at mutually different positions.

Figure 6:
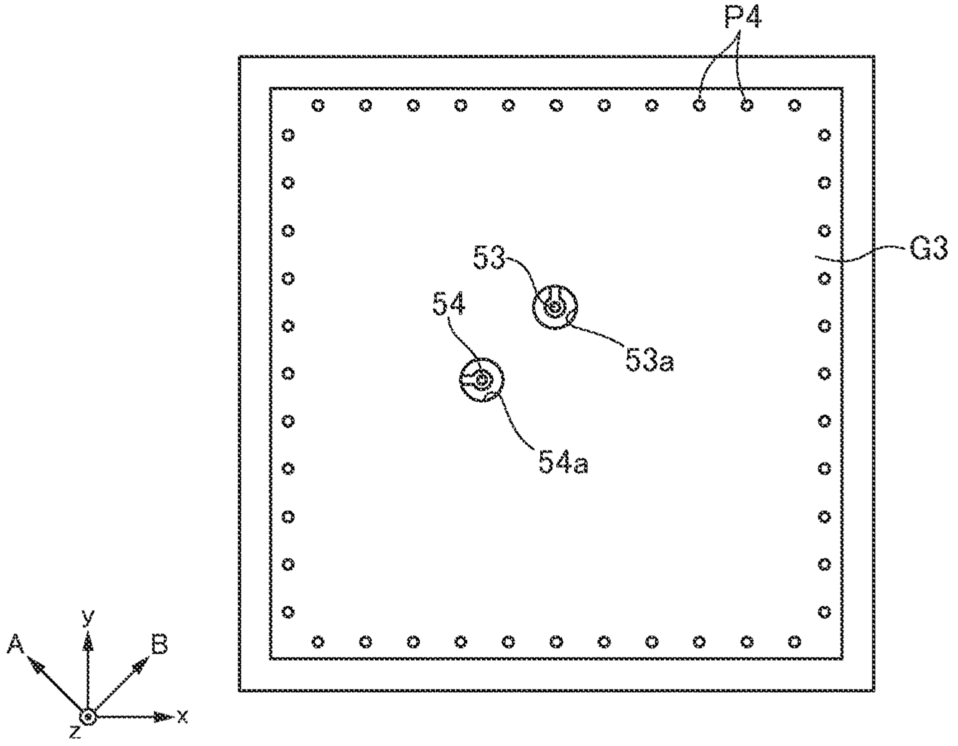

The conductor pattern illustrated in FIG. 6 is a conductor pattern positioned in the upper layer of the conductor pattern illustrated in FIG. 5 and has a ground pattern G3 formed on substantially the entire surface of the xy plane. The ground pattern G3 is connected to the ground patterns G2 through the through hole conductor P3 illustrated in FIG. 5. As illustrated in FIG. 6, the ground pattern G3 has openings 53*a* and 54*a* through which the through hole conductors 53 and 54 connected respectively to the other ends of the third and sixth wires 23 and 26 pass. Since the through hole conductor 53 is connected to the other end of the third wiring 23, the opening 53*a* through which the through hole conductor 53 penetrates is provided at a position not overlapping the first opening 51*a* in a plan view. Further, since the through hole conductor 54 is connected to the other end of the sixth wiring 26, the opening 54*a* through which the through hole conductor 54 penetrates is provided at a position not overlapping the second opening 52*a* in a plan view. The ground pattern G3 is further connected to a ground pattern in the upper layer through a plurality of through hole conductors P4. The plurality of through hole conductors P4 are parts of the ground patterns P shown in FIG. 1.

Figure 7:
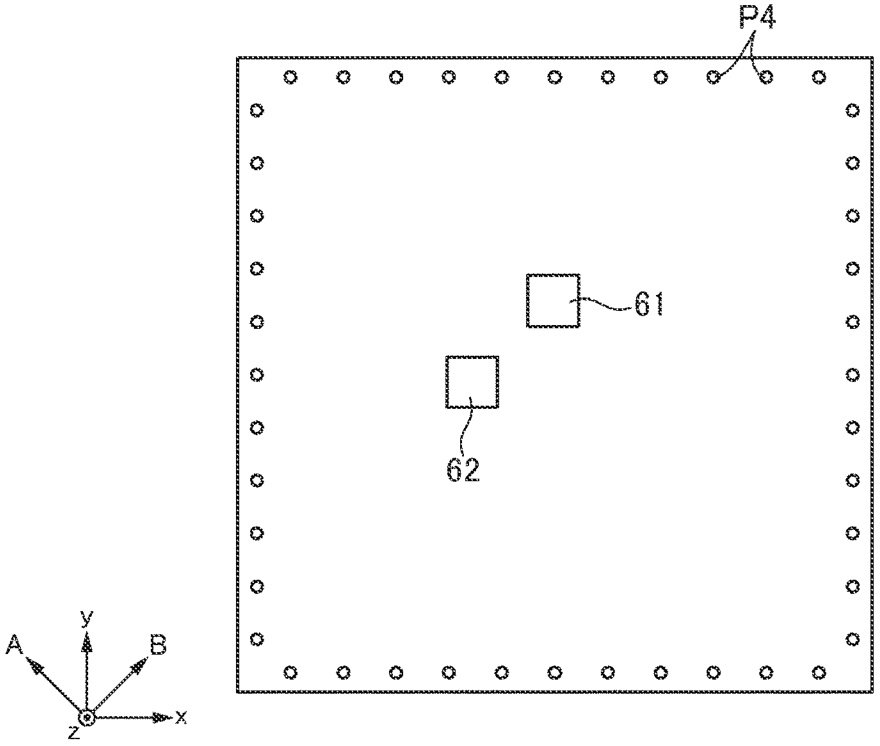

The conductor pattern illustrated in FIG. 7 is a conductor pattern positioned in the upper layer of the conductor pattern illustrated in FIG. 6 and has first and second capacitive coupling electrodes 61 and 62. The first and second capacitive coupling electrodes 61 and 62 are connected respectively to the through hole conductors 53 and 54.

Figure 8:
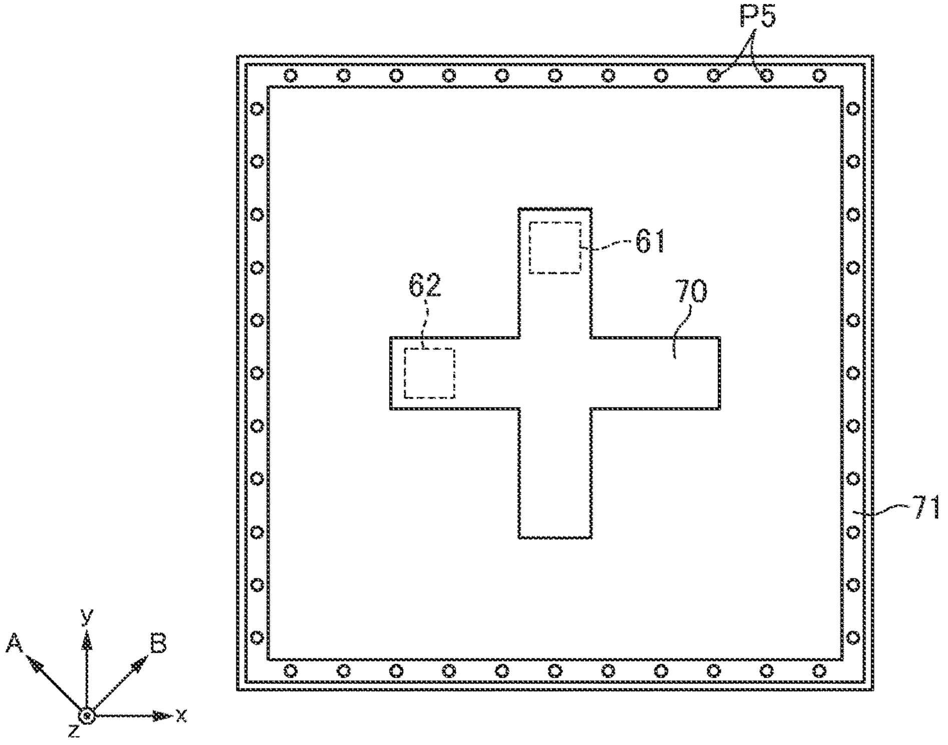

The conductor pattern illustrated in FIG. 8 is a conductor pattern positioned in the upper layer of the conductor pattern illustrated in FIG. 7 and has a feed electrode 70 and a ground pattern 71. The feed electrode 70 has a cross shape, in which one end portion in the y-direction overlaps the first capacitive coupling electrode 61, and one end portion in the x-direction overlaps the second capacitive coupling electrode 62. As a result, the feed electrode 70 is capacitively coupled to the first and second capacitive coupling electrodes 61 and 62. The ground pattern 71 has a rectangular annular shape disposed along the outer periphery and is connected to the ground pattern G3 through the through hole conductors P4 illustrated in FIGS. 6 and 7. The ground pattern 71 is further connected to a ground pattern in the upper layer through a plurality of through hole conductors P5. The ground pattern 71 and the plurality of through hole conductors P5 are other parts of the ground patterns P shown in FIG. 1.

Figure 9:
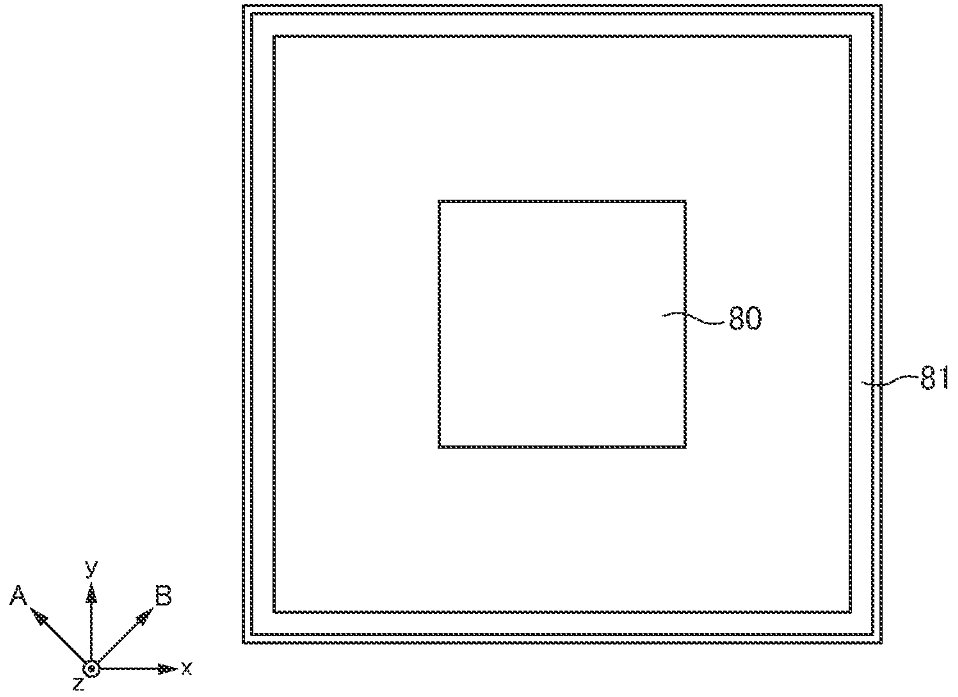

The conductor pattern illustrated in FIG. 9 is a conductor pattern positioned in the upper layer of the conductor pattern illustrated in FIG. 8 and has the radiation electrode 80 and a ground pattern 81. The ground pattern 81 is a still another part of the ground conductor P illustrated in FIG. 1 and constitutes the upper end of the ground conductor P. Since the radiation electrode 80 and ground pattern 81 are thus formed on the same conductor layer, they are positioned on the same plane. That is, the surface of the radiation electrode 80 on the side opposite to the surface thereof on the feed electrode 70 side and the end surface of the ground conductor P on the side opposite to the end surface thereof on the ground pattern G3 side are flush with each other. However, the upper ends of the radiation electrode 80 and ground conductor P need not completely be flush with each other, but there may be a height difference corresponding to the thickness of one conductor layer between the upper ends of the radiation electrode 80 and ground conductor P. The radiation electrode 80 is a patch conductor having a substantially rectangular shape and overlaps the feed electrode 70. As a result, the radiation electrode 80 and the feed electrode 70 are capacitively coupled to each other and thus resonate in the frequency band of an electromagnetic wave radiated from the radiation electrode 80. The ground pattern 81 has a rectangular annular shape disposed along the outer periphery and is connected to the ground pattern 71 through the through hole conductors P5 illustrated in FIG. 8. The shape of the radiation electrode 80 is not limited to a substantially rectangular shape, but may be a substantially circular shape, a substantially elliptic shape, or a substantially polygonal shape other than the rectangular shape.

With the above configuration, the first ½ wavelength filer F1 is inserted between the first signal pad 11 and the radiation electrode 80, and the second ½ wavelength filer F2 is inserted between the second signal pad 12 and the radiation electrode 80. Thus, a vertically polarized signal supplied to the first signal pad 11 and a horizontally polarized signal supplied to the second signal pad 12 are fed to the radiation electrode 80, respectively, through the first and second ½ wavelength filters F1 and F2, thereby achieving dual polarization.

Figure 10A:
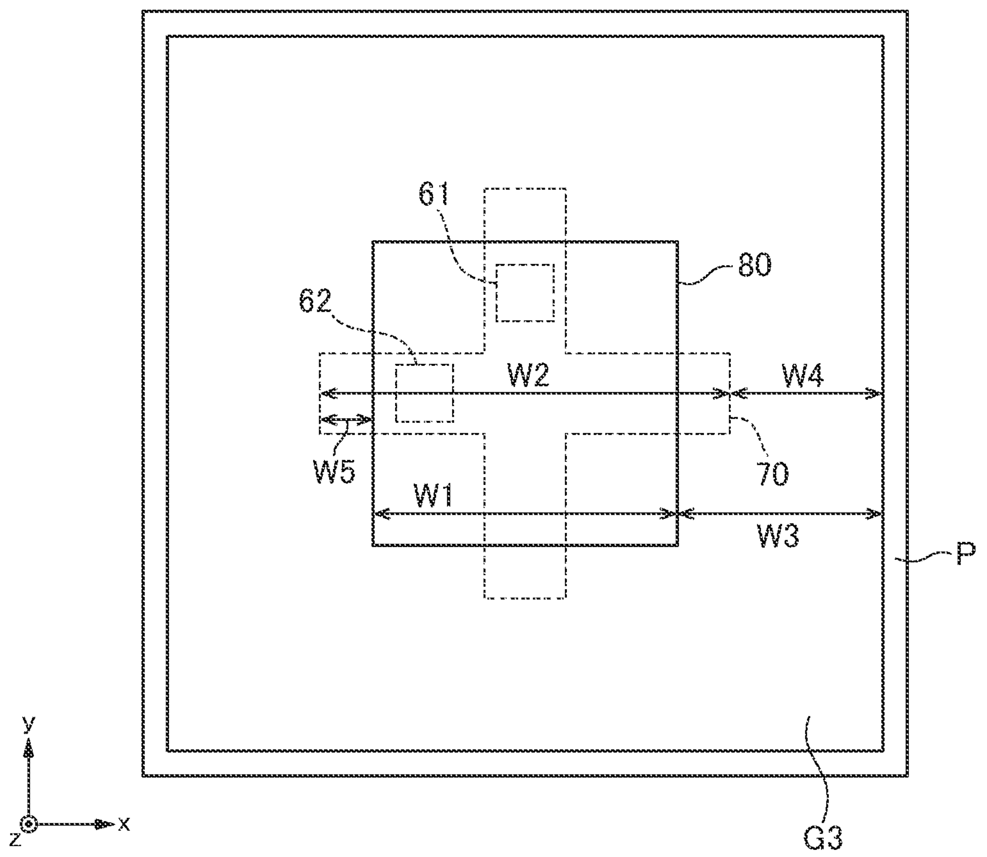
FIGS. 10A and 10B are schematic views for explaining the positional relation between the feed electrode 70, radiation electrode 80, and ground conductor P, where
Figure 10B:
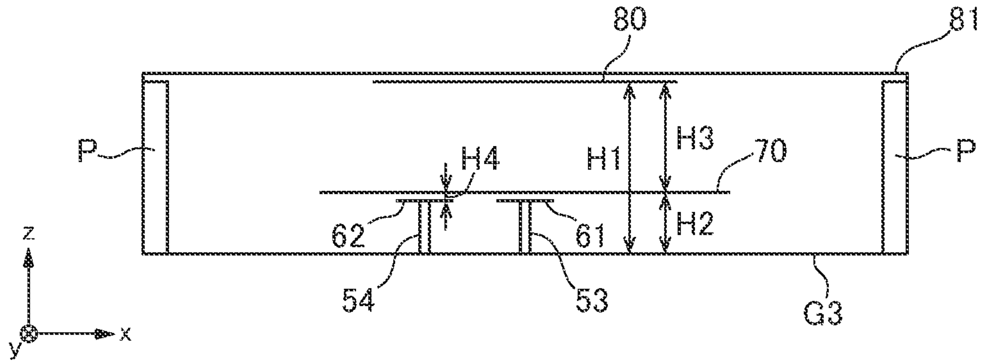

FIGS. 10A and 10B are schematic views for explaining the positional relation between the feed electrode 70, radiation electrode 80, and ground conductor P. FIG. 10A is a schematic plan view, and FIG. 10B is a schematic side view. In FIGS. 10A and 10B, the ground conductor P is illustrated as a wall-shaped conductor for descriptive convenience.

As illustrated in FIGS. 10A and 10B, the ground conductor P has a part extending in the x-direction and a part extending in the y-direction and, accordingly, the area surrounded by the ground conductor P has a rectangular shape in a plan view. The feed electrode 70 and radiation electrode 80 are disposed at the center of the rectangular area surrounded by the ground conductor P in a plan view. The cross-shaped feed electrode 70 has a part extending in the x-direction and a part extending in the y-direction. The sides of the rectangular radiation electrode 80 extend in the x- and y-directions. In the present embodiment, the radiation electrode 80 has a substantially square planar shape, and the area surrounded by the ground conductor P is substantially square in a plan view, so that the distance between each side of the radiation electrode 80 and the ground conductor P in the planar direction (x- or y-direction) is constant. Specifically, the distance in the y-direction between the side of the radiation electrode 80 extending in the x-direction and the part of the ground conductor P extending in the x-direction is constant, and the distance in the x-direction between the side of the radiation electrode 80 extending in the y-direction and the part of the ground conductor P extending in the y-direction is constant.

As described above, the radiation electrode 80 is surrounded by the ground conductor P in a plan view and thus resonates not only with the ground pattern G3 but also with the ground conductor P. Thus, as compared to a case where the ground conductor P is absent, an available bandwidth can be enlarged. Here, assuming that the length of one side of the radiation electrode 80, i.e., the planar size of the radiation electrode 80 is W1 and that the length of the feed electrode 70 in the x- or y-direction, i.e., the planar size of the feed electrode 70 is W2, W1<W2 is satisfied in the present embodiment. Accordingly, a distance W3 in the planar direction between the radiation electrode 80 and the ground conductor P is larger than a distance W4 in the planar direction between the feed electrode 70 and the ground conductor P, with the result that the feed electrode 70 partly protrudes from the radiation electrode 80 in the x- or y-direction in a plan view. Thus, when the radiation electrode 80 resonates with the ground conductor P, it is possible to suppress a significant reduction in resonance frequency due to an inductance component of the ground conductor P, whereby the resonance can be made at a desired frequency. A protruding amount W5 of the feed electrode 70 from the radiation electrode 80 in the planar direction is smaller than the distance W4 in the planar direction between the feed electrode 70 and the ground conductor P.

Further, assuming that the distance in the thickness direction (z-direction) between the ground pattern G3 and the radiation electrode 80 is H1 and that the distance in the thickness direction (z-direction) between the ground pattern G3 and the feed electrode 70 is H2, the distance H1 is about three times the distance H2, and thus the feed electrode 70 is offset to the ground pattern G3 side. Accordingly, the distance H2 in the thickness direction (z-direction) between the ground pattern G3 and the feed electrode 70 is smaller than a distance H3 in the thickness direction (z-direction) between the feed electrode 70 and the radiation electrode 80. Further, a distance H4 in the thickness direction (z-direction) between the feed electrode 70 and the capacitive coupling electrodes 61, 62 disposed between the ground pattern G3 and the feed electrode 70 is smaller than the distance H3 in the thickness direction (z-direction) between the feed electrode 70 and the radiation electrode 80, whereby the capacitive coupling electrodes 61, 62 and the feed electrode 70 are strongly coupled to each other.

As described above, in the present embodiment, the radiation electrode 80 resonates with the ground pattern G3 and ground conductor P, so that as compared to a case where the ground conductor P is absent, the planar size of the radiation electrode 80 is reduced. Therefore, as compared to a case where the ground conductor P is absent, an available bandwidth can be enlarged, and it is possible to suppress a significant reduction in resonance frequency due to an inductance component of the ground conductor P, whereby the resonance can be made at a desired frequency. Further, in the present embodiment, the length W1 of one side of the radiation electrode 80 is less than ½ of the wavelength of an electromagnetic wave radiated from the radiation electrode 80. Further, in the present embodiment, W1<W2 is satisfied, the distance W3 in the planar direction between the radiation electrode 80 and the ground conductor P is equal to or more than the distance H1 in the thickness direction (z-direction) between the radiation electrode 80 and the ground pattern G3, and the upper ends of the radiation electrode 80 and ground conductor P substantially flush with each other, thereby preventing the radiation electrode 80 and the ground conductor P from being coupled too strongly. This makes coupling between the radiation electrode 80 and the feed electrode 70 dominant, whereby stable antenna characteristics can be achieved.

On the other hand, the feed electrode 70 disposed between the ground pattern G3 and the radiation electrode 80 has a planar size larger than that of the radiation electrode 80, making it possible to achieve sufficient coupling to the radiation electrode 80. Further, the distance H3 in the thickness direction (z-direction) between the feed electrode 70 and the radiation electrode 80 is smaller than the distance W4 in the planar direction between the feed electrode 70 and the ground conductor P, and the protruding amount W5 of the feed electrode 70 from the radiation electrode 80 in the planar direction is smaller than the distance W4 in the planar direction between the feed electrode 70 and the ground conductor P, so that coupling between the feed electrode 70 and the ground conductor P is relatively weak. Thus, the planar size W2 of the feed electrode 70 is a little under ½ of the wavelength of an electromagnetic wave radiated from the radiation electrode 80.

As described above, in the antenna module 1 according to the present embodiment, the feed electrode 70, radiation electrode 80, and ground conductor P have the above positional relation, so that it is possible to achieve a high gain and a large bandwidth.

Figure 11A:
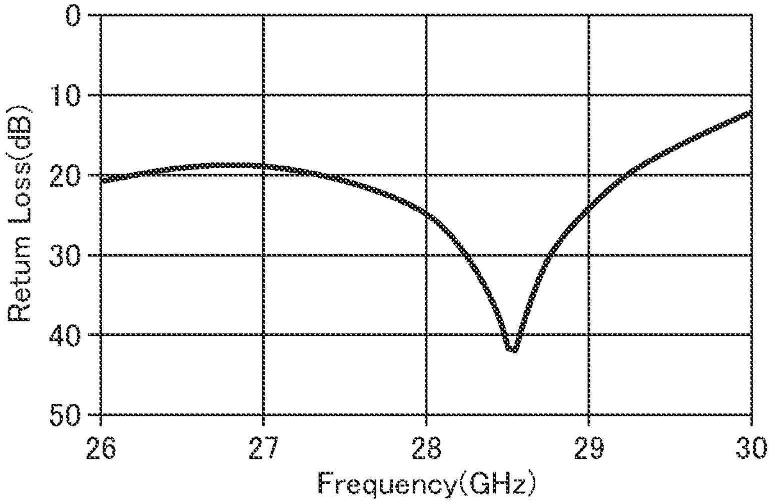
FIGS. 11A to 11C are graphs each illustrating the return loss characteristics of the antenna module 1, where
Figure 11B:
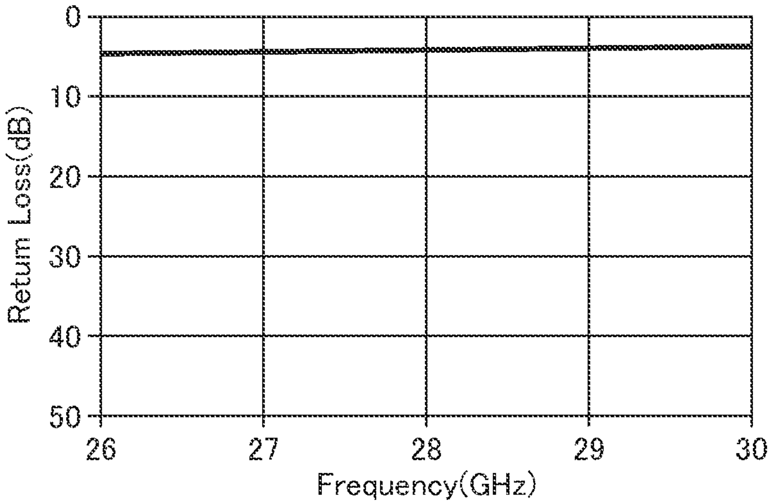
Figure 11C:
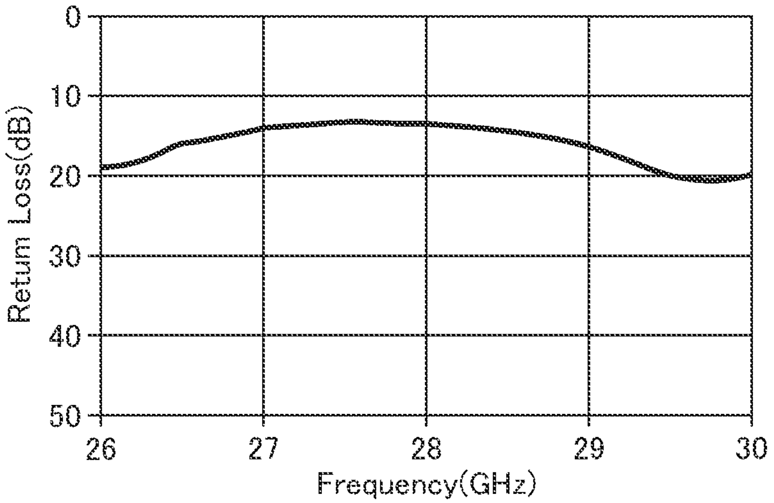

FIGS. 11A to 11C are graphs each illustrating the return loss characteristics of the antenna module 1. FIG. 11A illustrates characteristics when W1>W2 and W3>H1 are both satisfied, FIG. 11B illustrates characteristics when W1=W2 and W3>H1 are both satisfied, and FIG. 11C illustrates characteristics when W1>W2 and W3<H1 are both satisfied.

As illustrated in FIG. 11A, when W1>W2 and W3>H1 are both satisfied, a large bandwidth centered at about 28.5 GHz can be ensured. On the other hand, as illustrated in FIG. 11B, when W1=W2 is satisfied, coupling between the radiation electrode 80 and the ground conductor P is too strong, so that a resonance point in 26 GHz to 30 GHz bands is eliminated. Further, as illustrated in FIG. 11C, when W3<H1 is satisfied, return loss characteristics are lower than those when W3>H1 is satisfied although somewhat high radiation characteristics are obtained in 26 GHz to 30 GHz bands.

Figure 12:
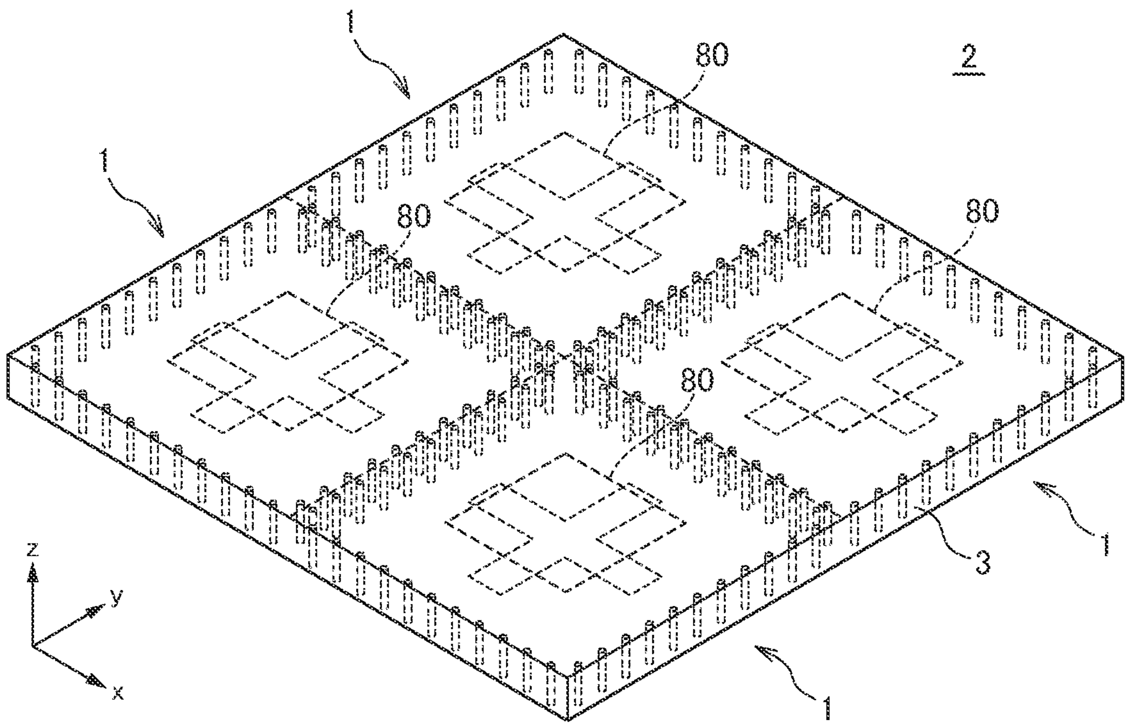
FIG. 12 is a schematic perspective view illustrating the outer appearance of an antenna module 2 according to a second embodiment of the present disclosure.

FIG. 12 is a schematic perspective view illustrating the outer appearance of an antenna module 2 according to a second embodiment of the present disclosure.

As illustrated in FIG. 12, the antenna module 2 according to the second embodiment has a structure in which four elements each having substantially the same structure as the conductor patterns included in the antenna module 1 are laid out in an array in the x- and y-directions. The four elements included in the antenna module 2 need not have completely the same structure as those of the antenna module 1 and may be partly different therefrom. By thus laying out a plurality of elements having substantially the same structure as the antenna module 1, it is possible to control a beam radiation direction under phase control.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

An antenna module according to the present disclosure includes: a ground pattern; a radiation electrode disposed on the ground pattern; a feed electrode disposed between the ground pattern and the radiation electrode; and a ground conductor surrounding the radiation electrode and feed electrode in a plan view. The planar size of the radiation electrode is smaller than the planar size of the feed electrode. With this configuration, as compared to a case where the ground conductor is absent, an available bandwidth can be enlarged, and it is possible to suppress a significant reduction in resonance frequency due to an inductance component of the ground conductor, whereby the resonance can be made at a desired frequency.

The distance in the planar direction between the radiation electrode and the ground conductor may be constant. Thus, the radiation electrode and the ground conductor are coupled to each other with the same strength in the x- and y-directions, thereby making it possible to obtain the same radiation pattern in the x- and y-directions.

The planar size of the radiation electrode may be less than ½ of the wavelength of an electromagnetic wave radiated from the radiation electrode. Thus, the planar size of the radiation electrode can be controlled by the degree of coupling between the radiation electrode and the ground conductor.

The feed electrode may have a cross shape. This makes it possible to achieve dual polarization while suppressing coupling between the feed electrode and the ground conductor.

The surface of the radiation electrode on the side opposite to the surface thereof on the feed electrode side and the end surface of the ground conductor on the side opposite to the end surface thereof on the ground pattern side may be substantially flush with each other. This prevents the radiation electrode and the ground conductor from being coupled too strongly.

The distance in the thickness direction between the feed electrode and the radiation electrode may be smaller than the distance in the planar direction between the feed electrode and the ground conductor. This makes it possible to achieve sufficient coupling between the feed electrode and the radiation electrode.

The antenna module according to the present disclosure may further include a capacitive coupling electrode disposed between the ground pattern and the feed electrode and capacitively coupled to the feed electrode, and the distance in the thickness direction between the capacitive coupling electrode and the feed electrode may be smaller than the distance in the thickness direction between the feed electrode and the radiation electrode. This makes it possible to achieve sufficient coupling between the capacitive coupling electrode and the feed electrode.

The protruding amount of the feed electrode from the radiation electrode in the planar direction may be smaller than the distance in the planar direction between the feed electrode and the ground conductor. This makes it possible to suppress coupling between the feed electrode and the ground conductor.

The distance in the planar direction between the radiation electrode and the ground conductor may be equal to or more than the distance in the thickness direction between the radiation electrode and the ground pattern. This prevents the radiation electrode and the ground conductor from being coupled too strongly.

What is claimed is:

1. An antenna module comprising:
- a first ground pattern;
- a radiation electrode disposed above the first ground pattern in a first direction;
- a feed electrode disposed between the first ground pattern and the radiation electrode in the first direction; and
- a ground conductor surrounding the radiation electrode and feed electrode when viewed from the first direction,
- wherein a planar size of the radiation electrode is smaller than a planar size of the feed electrode,
- wherein the ground conductor includes a plurality of through hole conductors arranged so as to surround the radiation electrode and feed electrode when viewed from the first direction and a second ground pattern having an annular shape and connected to the first ground pattern through the plurality of through hole conductors,
- wherein the ground conductor further includes a third ground pattern having an annular shape and connected to the first and second ground patterns through the plurality of through hole conductors, and
- wherein the third ground pattern is arranged between the first ground pattern and the second ground pattern in the first direction without the third ground pattern overlapping the feed electrode in the first direction.

2. The antenna module as claimed in claim 1, wherein a distance between the radiation electrode and the ground conductor in a second direction perpendicular to the first direction is constant.

3. The antenna module as claimed in claim 2, wherein a planar size of the radiation electrode is less than ½ of the wavelength of an electromagnetic wave radiated from the radiation electrode.

4. The antenna module as claimed in claim 1, wherein the feed electrode has a cross shape.

5. The antenna module as claimed in claim 1, wherein a surface of the radiation electrode on a side opposite to a surface thereof on the feed electrode side and an end surface of the ground conductor on a side opposite to an end surface thereof on the first ground pattern side are flush with each other.

6. The antenna module as claimed in claim 1, wherein a distance in the first direction between the feed electrode and the radiation electrode is smaller than a distance in a second direction perpendicular to the first direction between the feed electrode and the ground conductor.

7. The antenna module as claimed in claim 1, further comprising a capacitive coupling electrode disposed between the first ground pattern and the feed electrode and capacitively coupled to the feed electrode, wherein a distance in the first direction between the capacitive coupling electrode and the feed electrode is smaller than a distance in the first direction between the feed electrode and the radiation electrode.

8. The antenna module as claimed in claim 1, wherein a protruding amount of the feed electrode from the radiation electrode in a second direction perpendicular to the first direction is smaller than a distance in the second direction between the feed electrode and the ground conductor.

9. The antenna module as claimed in claim 1, wherein a distance in a second direction perpendicular to the first direction between the radiation electrode and the ground conductor is equal to or more than a distance in the first direction between the radiation electrode and the first ground pattern.

10. The antenna module as claimed in claim 1, wherein the third ground pattern and the feed electrode are formed on a same conductor layer.

11. The antenna module as claimed in claim 1, wherein each of the plurality of through hole conductors has a first end connected to the first ground pattern and a second end connected to the second ground pattern.

12. The antenna module as claimed in claim 11, wherein the second ground pattern and the radiation electrode are formed on a same conductor layer.

13. The antenna module as claimed in claim 12, wherein the ground conductor further includes a third ground pattern having an annular shape and connected to the first and second ground patterns through the plurality of through hole conductors, and wherein the third ground pattern and the feed electrode are formed on a same conductor layer.

* * * * *